(No Model.)

F. X. KRABACH.
CULTIVATOR OR HARROW TOOTH.

No. 461,837. Patented Oct. 27, 1891.

Witnesses:
C. H. Raeder
Thomas E. Turpin

Inventor
Frank X. Krabach
James Sheehy
Attorney

UNITED STATES PATENT OFFICE.

FRANK X. KRABACH, OF DEFIANCE, OHIO.

CULTIVATOR OR HARROW TOOTH.

SPECIFICATION forming part of Letters Patent No. 461,837, dated October 27, 1891.

Application filed January 3, 1891. Serial No. 376,587. (No model.)

*To all whom it may concern:*

Be it known that I, FRANK X. KRABACH, a citizen of the United States, residing at Defiance, in the county of Defiance and State of Ohio, have invented certain new and useful Improvements in Cultivator or Harrow Teeth; and I do declare the following to be a full, clear, and exact description of the invention, such as will enable others skilled in the art to which it appertains to make and use the same.

This invention has relation to an improvement in teeth for harrows, cultivators, and like agricultural machines; and it has for its object to render such teeth effective in cutting soil, grass, and weeds, pulverizing the earth, and mixing and covering therewith such weeds and grass as may come within the path of the cutting-blade; to provide means in connection with the main cutter for keeping the tooth in the soil, destroying the roots of weeds and the like, and to lessen the draft by giving the plowed soil a slight lifting motion while being turned out of the earth.

Other objects and advantages will appear from the following description and claims when taken in connection with the accompanying drawings, in which—

Figure 1:
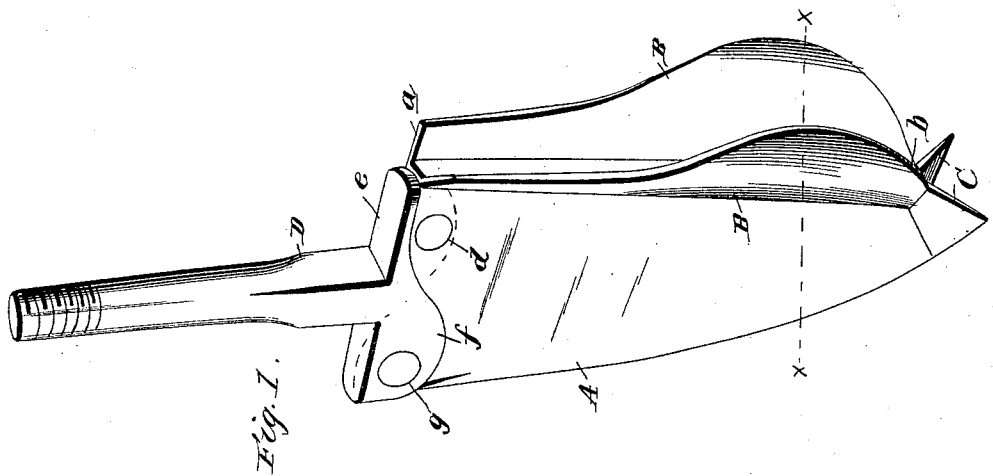
Figure 3:
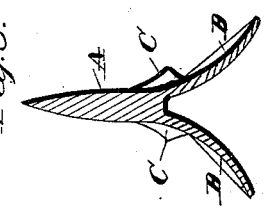
Figure 2:
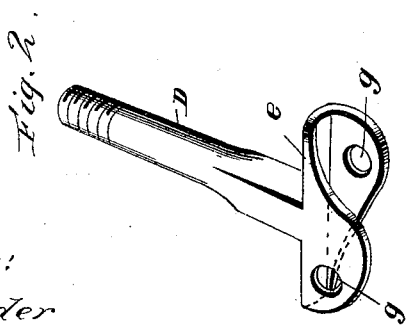

Figure 1 is a perspective view of my improved tooth attached to the shank and in a position ready for use. Fig. 2 is a perspective view of the shank removed. Fig. 3 is a sectional view taken in the plane indicated by the dotted line $x$ $x$ on Fig. 1.

Referring by letter to said drawings, A indicates the tooth or blade, which is provided in its forward longitudinal edge with a cutting-surface and increases in thickness rearwardly, as shown. This tooth or blade has its cutting-edge tapering from above downwardly and its rear thickened edge is approximately straight.

B indicates flanges, which are of a similar form. These flanges extend rearwardly oblique in a vertical position at the rear of the blade A and have their outer edges curved, as shown, the curve starting from the upper end of said wings or flanges, as shown at $a$, and thence gradually increasing in width downwardly and outwardly and thence inwardly to the points $b$, adjacent to the point of the cutting-blade. These wings or flanges are designed to pulverize and turn the soil and such trash as may be cut in the path of the tooth by the blade A and are so shaped as to turn the soil over weeds that may be turned up by the cultivator. At the lower end or point of the tooth A, and also the wings or flanges B, I form auxiliary cutters C, which diverge laterally and are designed to cut roots and other similar obstacles over which the main cutter of the tooth A is allowed to pass. These auxiliary cutters, which diverge or extend laterally in an oblique position and approximately horizontally, serve the additional function of lessening the draft by tending to raise the soil as it is cut by the edge of the tooth A. The tooth or blade A is also provided at its upper end with eyes or holes $d$ to receive transverse bolts, screws, or the like.

D indicates a shank for the attachment of the teeth to a suitable frame or beam. This shank is threaded at its upper end, as shown, and its lower end has a plate $e$ formed thereon, from which depend ears $f$, having holes $g$, corresponding with the holes $d$ in the tooth. It will be observed that while these depending ears are parallel and are designed to embrace the upper end of the tooth A, yet they are so formed as to have the bolt-holes one in each ear and out of alignment.

While I prefer to make the teeth A with the turning wings or flanges and also the auxiliary cutter entire, yet it is obvious that they may be made separately and secured to each other without departing from the spirit of the invention.

It should be observed that the flanges or wings B have concave faces and their upper portions slope rearwardly, so that as they enter the soil such soil, together with weeds and the like which come in the path, will be given a turning or tumbling motion and will be buried or covered as the harrow or cultivator advances.

Having described my invention, what I claim, and desire to secure by Letters Patent, is—

1. As an article of manufacture, a tooth for harrows, cultivators, and the like, comprising a blade having a front downwardly-tapering edge, the two vertically-disposed turning wings extending laterally oblique from the rear edge of said blade and having a wide lower portion and a tapering upper portion, and the two base or auxiliary blades at the lower end of the main blade and the wings, said auxiliary base-blades being deflected outwardly and downwardly from the lower ends of the wings, substantially as specified.

2. The blade having the forward vertical cutting-edge and its rear vertical edge increased in thickness, the outwardly-curved wings or flanges B at the rear thickened portion and having their edges curved, as shown, and the base or auxiliary cutters C, deflecting outwardly and downwardly from the lower ends of the oblique wings, substantially as specified.

In testimony whereof I affix my signature in presence of two witnesses.

FRANK X. KRABACH.

Witnesses:
J. I. HOEFFEL,
N. KRABACH.